(12) United States Patent
Pan et al.

(10) Patent No.: US 11,458,459 B2
(45) Date of Patent: Oct. 4, 2022

(54) MESOPOROUS OZONATION CATALYST, PREPARATION METHOD THEREOF, AND APPLICATION METHOD THEREOF

(71) Applicant: Nanjing University, Nanjing (CN)

(72) Inventors: Bingcai Pan, Nanjing (CN); Chao Shan, Nanjing (CN); You Xu, Nanjing (CN); Zhichao Yang, Nanjing (CN); Weiming Zhang, Nanjing (CN); Lu Lyu, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 561 days.

(21) Appl. No.: 16/505,748

(22) Filed: Jul. 9, 2019

(65) Prior Publication Data
US 2019/0329224 A1 Oct. 31, 2019

Related U.S. Application Data

(63) Continuation-in-part of application No. PCT/CN2017/104494, filed on Sep. 29, 2017.

(30) Foreign Application Priority Data

Mar. 31, 2017 (CN) .......................... 201710208468.3

(51) Int. Cl.
*B01J 23/10* (2006.01)
*B01J 23/00* (2006.01)
(Continued)

(52) U.S. Cl.
CPC ............. *B01J 23/10* (2013.01); *B01J 23/002* (2013.01); *B01J 23/92* (2013.01); *B01J 35/023* (2013.01); *B01J 35/026* (2013.01); *B01J 35/08* (2013.01); *B01J 35/1019* (2013.01); *B01J 35/1038* (2013.01); *B01J 35/1061* (2013.01); *B01J 37/009* (2013.01); *B01J 37/0018* (2013.01); *B01J 37/0213* (2013.01); *B01J 37/0236* (2013.01); *B01J 37/06* (2013.01); *B01J 37/10* (2013.01); *B01J 38/02* (2013.01); *B01J 38/48* (2013.01); *C01F 17/30* (2020.01); *C02F 1/725* (2013.01); *C02F 1/78* (2013.01); *B01J 2523/3712* (2013.01); *B01J 2523/47* (2013.01); *B01J 2523/48* (2013.01); *C01P 2002/01* (2013.01); *C01P 2002/90* (2013.01); *C02F 2101/34* (2013.01); *C02F 2303/16* (2013.01)

(58) Field of Classification Search
CPC . B01J 23/10; B01J 23/002; B01J 23/92; B01J 35/026; B01J 35/08; B01J 35/1019; B01J 35/1038; B01J 35/1061; B01J 37/0018; B01J 37/009; B01J 37/0213; B01J 37/0236; B01J 37/06; B01J 37/10; B01J 38/02; B01J 38/48; C01F 7/30
See application file for complete search history.

(56) References Cited

U.S. PATENT DOCUMENTS

2003/0096880 A1* 5/2003 Wang ..................... C01B 3/40
518/714

* cited by examiner

*Primary Examiner* — James A Fiorito
(74) *Attorney, Agent, or Firm* — Matthias Scholl P.C.; Matthias Scholl

(57) ABSTRACT

A mesoporous ozonation catalyst including a cerium-titanium-zirconium composite oxide. The catalyst is in the form of a solid spherical particle having a diameter of between 0.7 and 1.2 mm. The solid spherical particle exhibits lattice fringes under transmission electron microscope, and the lattice fringes have a spacing between 0.332 and 0.339 nm.

6 Claims, 8 Drawing Sheets

(51) Int. Cl.
*B01J 23/92* (2006.01)
*B01J 35/02* (2006.01)
*B01J 35/08* (2006.01)
*B01J 35/10* (2006.01)
*B01J 37/00* (2006.01)
*B01J 37/02* (2006.01)
*B01J 37/06* (2006.01)
*B01J 37/10* (2006.01)
*B01J 38/02* (2006.01)
*B01J 38/48* (2006.01)
*C02F 1/72* (2006.01)
*C02F 1/78* (2006.01)
*C01F 17/30* (2020.01)
*C02F 101/34* (2006.01)

MESOPOROUS OZONATION CATALYST, PREPARATION METHOD THEREOF, AND APPLICATION METHOD THEREOF

CROSS-REFERENCE TO RELATED APPLICATIONS

This application is a continuation-in-part of International Patent Application No. PCT/CN2017/104494 with an international filing date of Sep. 29, 2017, designating the United States, now pending, and further claims foreign priority benefits to Chinese Patent Application No. 201710208468.3 filed Mar. 31, 2017. The contents of all of the aforementioned applications, including any intervening amendments thereto, are incorporated herein by reference. Inquiries from the public to applicants or assignees concerning this document or the related applications should be directed to Matthias Scholl P. C., Attn.: Dr. Matthias Scholl Esq., 245 First Street, 18th Floor, Cambridge, Mass. 02142.

BACKGROUND

The invention relates to the field of water treatment, and more particularly, to a mesoporous ozonation catalyst, a method of producing the same, and a method of using the same.

Catalytic ozonation has recently gained significant attention as an effective process used for the removal of organics from water. The catalysts involved in the process are powders having nanometer and micron particle sizes. In use, the powders cause hydraulic resistance and are difficult to separate from the liquid for recycling.

There are various kinds of ozonation catalysts but most are not perfect. For example, ceramic-based ozonation catalysts have relatively small specific surface and pore volume; carbon-based ozonation catalysts tend to lose mass and lack stability in the oxidation environment; molecular sieve-based catalysts contain elements such as silicon and aluminum, which makes it difficult to meet the requirements of acid and base resistance.

SUMMARY

The disclosure provides a mesoporous ozonation catalyst and a preparation and application method thereof. The mesoporous ozonation catalyst of the disclosure exhibits better and longer catalytic activity, hydrodynamic properties, acid and alkali resistance, oxidation resistance, mechanical strength, and thermal stability than conventional ozonation catalysts.

Disclosed is a mesoporous ozonation catalyst comprising a cerium-titanium-zirconium composite oxide. The catalyst is in the form of a solid spherical particle having a diameter of between 0.7 and 1.2 mm. The solid spherical particle exhibits lattice fringes under transmission electron microscope, and the lattice fringes have a spacing between 0.332 and 0.339 nm. Specifically, the spacing is between an interplanar spacing of cerium oxide (0.312 nm) and an interplanar spacing (0.352 nm) of anatase titanium dioxide.

The solid spherical particle comprises 10-15 wt. % of cerium, 30-50 wt. % of titanium, 5-15 wt. % of zirconium, 30-50 wt. % of oxygen, and less than 2 wt. % of calcium.

The solid spherical particle is porous with an average pore diameter of between 4.0 and 7.0 nm, a specific surface area of the solid spherical particle is between 160 and 200 m$^2$/g, and a pore volume of the solid spherical particle is between 0.31 and 0.34 cm$^3$/g.

The cerium comprises 45-55% of trivalent cerium, and the balance is tetravalent cerium. The redox couples of trivalent cerium/tetravalent cerium on the surface of the spherical particle can improve the catalytic performance of the catalyst.

A method for preparing the aforesaid mesoporous ozonation catalyst, comprises:

1) preparation of template bead comprising calcium alginate gel:

stirring and dropwise adding a sodium alginate aqueous solution to a CaCl$_2$ aqueous solution at a temperature of between 15 and 30° C. to yield a gel bead; continuously stirring for 12-24 hours to allow the sodium alginate aqueous solution in the gel bead to transform into a calcium alginate gel, and washing the gel bead to yield a template bead comprising calcium alginate gel;

2) preparation of titanium-zirconium composite oxide bead:

washing the template bead in 1) with anhydrous ethanol, infiltrating the template bead with a mixed alkoxide solution of titanium and zirconium for 12 to 24 hours, transferring and immersing the template bead in an aqueous solution of isopropyl alcohol for 12-24 hours, taking out the template bead, drying the template bead at a temperature of between 15 and 30° C. for 24-72 hours and at 55-65° C. for 4-8 h, calcining the template bead for 3-8 hours at 350-600° C., cooling to normal temperature, washing with a nitric acid solution, washing with water, and drying to obtain a titanium-zirconium composite oxide bead;

3) immersing the titanium-zirconium composite oxide bead obtained in Ce(NO$_3$)$_3$ solution for 2-8 hours, filtering and collecting the solid, drying the solid at 105° C. for 12-24 hours to obtain a bead; and 4) calcining the obtained bead in 3) at a temperature of 400 to 500° C. for 2 to 6 hours, to yield the mesoporous ozonation catalyst.

In 2), the mixed alkoxide solution of titanium and zirconium comprises titanium isopropoxide and a n-propanol solution comprising 70 wt. % of zirconium n-propoxide, and a volume ratio of the titanium isopropoxide to the n-propanol solution is between 2:1 and 6:1.

In 2), the mass of the mixed alkoxide solution of titanium and zirconium is 2 to 8 times that of the template bead; and the aqueous solution of isopropyl alcohol is prepared by mixing pure water and isopropyl alcohol in a volume ratio of 0.5-2:1.

The concentration of the Ce(NO$_3$)$_3$ solution in (3) is between 0.10 and 0.25 mol/L.

Further provided is a method for using the mesoporous ozonation catalyst. The method comprises placing the catalyst in a fixed bed or fluidized bed reactor; introducing wastewater to the fixed bed or fluidized bed reactor continuously or in batches; continuously or in batches aerating the wastewater in the reactor with an ozone-containing gas. Under the action of the mesoporous ozonation catalyst, the contaminants are degraded, and the wastewater is continuously or intermittently discharged from the reactor; the mesoporous ozonation catalyst separates from the wastewater by gravity and stays in the reactor.

The method further comprises regeneration of the catalyst, which comprises taking the catalyst out of the reactor, washing with water and drying, calcining at 200-500° C. for 2-6 hours, and cooling.

The characterization of the catalyst is determined by transmission electron microscopy (TEM), scanning transmission electron microscopy (STEM), powder X-ray diffraction (XRD), N$_2$ adsorption/desorption, and X-ray photoelectron spectroscopy (MIS). The mesoporous ozonation catalyst has a unique crystalline structure, and the crystalline phase of the cerium oxide contained in the catalyst is different from that of the cerium oxide obtained by direct calcination. The catalyst is not a simple combination of cerium oxide and titanium-zirconium composite oxide, nor is it a supported catalyst formed by supporting ceria nanoparticles in nanopores of titanium-zirconium composite oxide bead. The catalytic effect of the catalyst is not a simple superposition of the effect of the titanium-zirconium composite oxide bead and the cerium oxide, especially the catalyst can significantly increase the degree of mineralization of ozonation. The catalyst has a wide range of applications and can catalyze ozone to oxidize contaminants more efficiently in the presence of sulfate. The catalyst has long-lasting and efficient catalytic activity and high stability, as well as does not lose active components or release hazardous materials even when repeatedly used under acidic conditions of pH=3. After repeated use, the composition of the valence state of the active component is unchanged.

Advantages of the catalyst according to embodiments of the disclosure are summarized as follows.

1. The mesoporous ozonation catalyst can improve the conversion efficiency of ozone into hydroxyl radical by 9 to 10 times.
2. The mesoporous ozonation catalyst is a mesoporous structure and has an average pore diameter of 4.0 to 7.0 nm, a specific surface area of 160-200 $m^2/g$ and the pore volume of 0.31-0.34 $cm^3/g$, all of which are conducive to the adsorption of pollutants.
3. The mesoporous ozonation catalyst has a compressive strength of more than 6.5 N, so it is not easy to break in the reactor.
4. The mesoporous ozonation catalyst comprises a cerium-titanium-zirconium composite oxide which is stable in acid/base conditions.
5. The active component of cerium-titanium-zirconium composite oxide of the mesoporous ozonation catalyst has the oxidation resistance.
6. The mesoporous ozonation catalyst is thermally stable even at 500° C.

DETAILED DESCRIPTION

To further illustrate, embodiments detailing a mesoporous ozonation catalyst, a preparation method thereof and an application method thereof are described below. It should be noted that the following embodiments are intended to describe and not to limit the disclosure.

EXAMPLE 1

Preparation and characterization of the mesoporous ozonation catalyst.

(1) Preparation of template bead comprising calcium alginate gel:

At a temperature of between 15 and 30° C., an aqueous solution of sodium alginate having a mass percentage of 1.0% was added dropwise to a 0.27 mol/L $CaCl_2$ aqueous solution using a syringe with needle having an inner diameter of 0.41 mm, and the injection flow rate was controlled at 4.5 mL/h using a syringe pump. Thereafter a gel bead was formed, stirred for 24 hours and washed with water to obtain a template bead comprising calcium alginate gel.

(2) Preparation of titanium-zirconium composite oxide bead:

The template bead prepared in (1) was washed with absolute ethanol, and then placed in a mixed alkoxide solution of titanium and zirconium for 24 hours, then transferred to an aqueous solution of isopropanol for 12 hours; after removing the solution, the template bead was dried at a temperature of between 15 and 30° C. for 48 hours, dried at 60° C. for 6 hours, calcined at 500° C. for 5 hours, cooled to normal temperature, washed with 0.1 mol/L nitric acid, washed with water and dried at 60° C. for 12 hours to obtain a titanium-zirconium composite oxide bead. The mixed alkoxide solution of titanium and zirconium was a mixed solution prepared by dissolving titanium isopropoxide (IV) and zirconium n-propoxide (70% n-propanol solution) in a volume ratio of 5:1. The mass of the mixed alkoxide solution of titanium and zirconium was 5 times that of the template bead comprising calcium alginate gel; the aqueous solution of isopropanol was a mixed solution of pure water and isopropyl alcohol in a volume ratio of 1:1.

(3) Impregnation: immersing the titanium-zirconium composite oxide bead prepared in (2) in a 0.14 mol/L $Ce(NO_3)_3$ solution for 5 hours, and filtering off the solution to yield a solid, then drying the solid at 105° C. for 12 hours.

(4) Calcination: the solid obtained in (3) was calcined at a temperature of 450° C. for 3 hours to obtain a spherical ozone oxidation catalyst having a mesoporous cerium-titanium-zirconium composite oxide as a main component.

Figure 1:
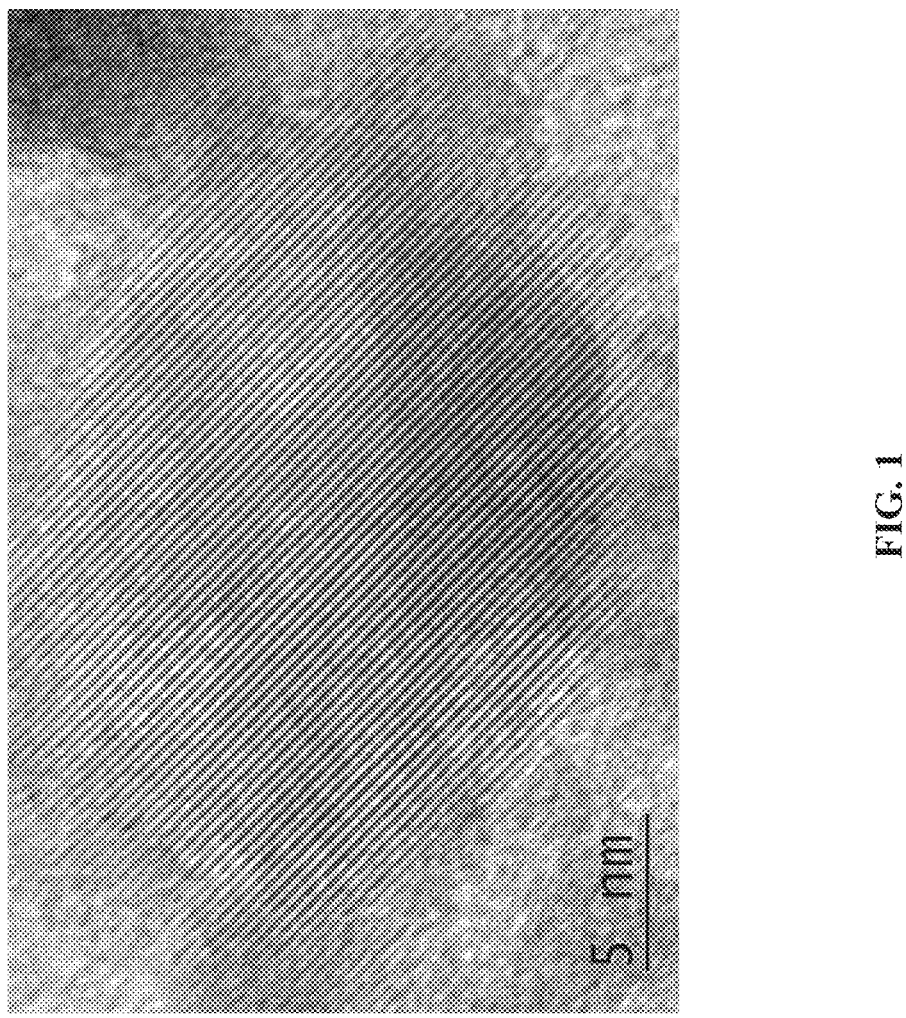
FIG. 1 shows the lattice fringes of a mesoporous ozonation catalyst prepared in Example 1 of the disclosure under a transmission electron microscope.

The ozonation catalyst was present as spherical particles with diameter distribution of 0.8-1.0 mm. The $N_2$ adsorption/desorption isotherms showed the catalyst had the specific surface area of 179.9 $m^2/g$, the pore volume of 0.323 $cm^3/g$, and the average pore diameter of 5.04 nm. Ten particles were randomly selected and tested using a particle strength tester and the average compressive strength was measured to be 7.6 N. The ground catalyst sample was subjected to energy spectrum analysis by the scanning electron microscope. The results showed that the mass fractions of cerium, titanium, zirconium, oxygen and calcium were 12.1%, 37.9%, 9.3%, 39.7% and 1.0%, respectively. The small amount of calcium therein was due to the incomplete removal of calcium during the washing of the calcium alginate template with nitric acid; one catalyst bead was cut into two halves and the cross-section was observed under the scanning electron microscope. When scanning along the diameter of the cross-section to analyze the energy spectrum, it was found that all four elements of cerium, titanium, zirconium and oxygen were uniformly distributed throughout the cross section. X-ray photoelectron spectroscopy (XPS, the same below) was used to characterize the valence state of cerium element consisting of trivalent and tetravalent, and the proportion of trivalent is 49%. As shown in FIG. 1, parallel lattice fringes with a stripe spacing of 0.336 nm were observed under a transmission electron microscope, indicating that a new substance having a unique crystalline structure was formed in the ozonation catalyst.

Figure 2:
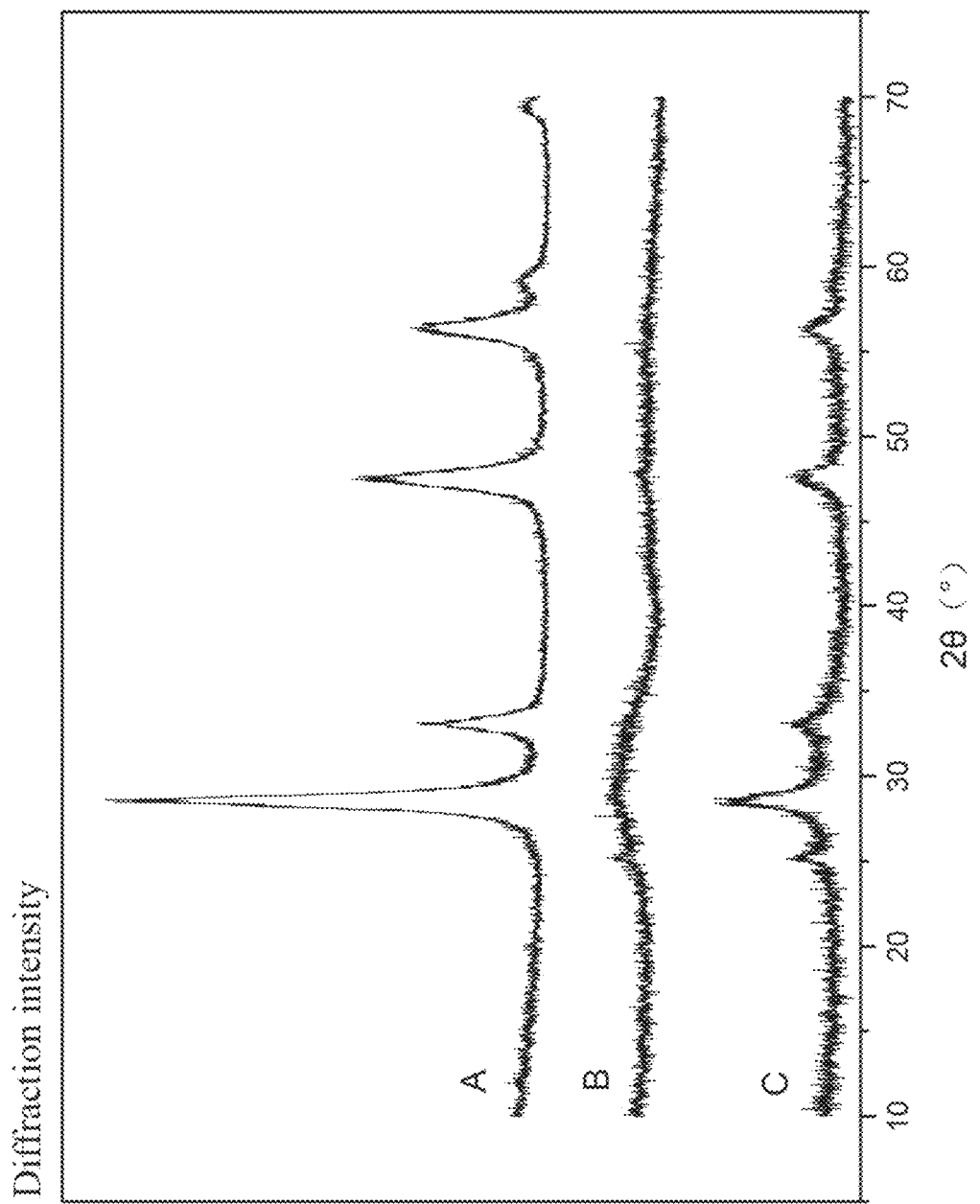
FIG. 2 shows an X-ray diffraction (XRD) pattern of a mesoporous ozonation catalyst prepared in Example 1 of the disclosure and a comparative material in the ground state.

The obtained ozonation catalyst was ground and characterized by powder X-ray diffraction detection (XRD, the same hereinafter), and as a result, there was no significant diffraction peak as shown in the curve B in FIG. 2. The XRD pattern of the cerium oxide powder prepared by calcining $Ce(NO_3)_3$ at 450° C. for 3 hours was shown in in the curve A in FIG. 2, showing a distinct crystalline phase of cerium oxide, which was consistent with JCPDF card 34-0394. The cerium oxide powder, as well as the titanium-zirconium composite oxide bead in (2) were ground, and then mixed according to the mass percentage of cerium in the ozonation catalyst. The XRD pattern of the mixed powder as shown in the curve C in FIG. 2 still showed the above crystalline phase of cerium oxide. The resulted showed that the crystalline phase of cerium oxide in the ozone oxidation catalyst was different from that of the cerium oxide obtained by direct calcination, indicating that the ozone oxidation catalyst prepared by impregnation in the mesoporous structure of the titanium-zirconium composite oxide bead was not a simple combination of cerium oxide and titanium-zirconium composite oxide, but a new cerium-titanium-zirconium composite oxide was formed. The catalyst samples were observed under a scanning transmission electron microscopy (STEM), and five square sampling regions with side length of 20 nm were randomly selected for energy spectrum scanning and the elemental map with a resolution of 0.6-0.7 nm was drawn. The results showed that all five regions contain cerium, titanium, zirconium and oxygen, and the four elements were evenly distributed in each region. There was no outline of any cerium-containing nanoparticles on the cerium elemental map. The relative content of the elements in the four element maps in each region was derived for correlation analysis, and the number of points was not less than 900. The results showed that all four elements were significantly correlated at the 0.01 level. The above results indicated that the mesoporous ozonation catalyst did not form a supported catalyst by supporting the cerium oxide nanoparticles in the nano-pores of the titanium-zirconium composite oxide sphere, but a new cerium-titanium-zirconium composite oxide was formed.

The above results indicated that the catalyst had good hydrodynamic properties, pore structure, mechanical strength and thermal stability. The ozonation catalyst had a new substance, had a unique crystalline structure, and was not a simple combination of cerium oxide and titanium zirconium composite oxide. The catalyst was also not a supported catalyst in which cerium oxide nanoparticles are supported in nanopores of titanium-zirconium composite oxide bead.

EXAMPLE 2

Preparation and characterization of the mesoporous ozonation catalyst.

(1) Preparation of template bead comprising calcium alginate gel:

At a temperature of between 15 and 30° C., an aqueous solution of sodium alginate having a mass percentage of 1.0% was added dropwise to a 0.27 mol/L $CaCl_2$ aqueous solution using a syringe with needle having an inner diameter of 0.25 mm, and the injection flow rate was controlled at 4.5 mL/h using a syringe pump. Thereafter a gel bead was formed, stirred for 12 hours and washed with water to obtain the template bead comprising calcium alginate gel.

(2) Preparation of titanium-zirconium composite oxide bead:

The template bead prepared in (1) was washed with absolute ethanol, and then placed in a mixed alkoxide solution of titanium and zirconium for 12 hours, then transferred to an aqueous solution of isopropanol for 24 hours; after removing the solution, the template bead was dried at a temperature of between 15 and 30° C. for 24 hours, and then dried at 65° C. for 4 hours; then calcined at 350° C. for 8 hours, cooled to normal temperature, washed with 0.1 mol/L nitric acid, washed with water and dried at 60° C. for 12 hours to obtain titanium-zirconium composite oxide bead. The mixed alkoxide solution of titanium and zirconium was a mixed solution prepared by dissolving titanium isopropoxide (IV) and zirconium n-propoxide (70% n-propanol solution) in a volume ratio of 6:1. The mass of the mixed alkoxide solution of titanium and zirconium was 2 times that of the template bead comprising calcium alginate gel; the aqueous solution of isopropanol was a mixed solution of pure water and isopropyl alcohol in a volume ratio of 0.5:1.

(3) Impregnation: immersing the titanium-zirconium composite oxide bead prepared in (2) in a 0.25 mol/L $Ce(NO_3)_3$ solution for 2 hours, and filtering off the solution to yield a solid, then drying the solid at 105° C. for 24 hours.

(4) Calcination: the solid obtained in (3) was calcined at a temperature of 400° C. for 6 hours to obtain a spherical ozone oxidation catalyst having a mesoporous cerium-titanium-zirconium composite oxide as a main component.

The ozonation catalyst was present as spherical particles with diameter distribution of 0.7-0.9 mm. Using the same test method in Example 1, a specific surface area of 195.0 $m^2/g$, a pore volume of 0.310 $cm^3/g$, an average pore diameter of 4.09 nm, and a compressive strength of 6.5 N were shown. The mass fractions of cerium, titanium, zirconium, oxygen and calcium were 15.0%, 48.7%, 5.2%, 30.6% and 0.5%, respectively. The valence state of cerium element consists of trivalent and tetravalent, and the proportion of trivalent was 45%. The parallel lattice fringes with a stripe spacing of 0.332 nm were observed under a transmission electron microscope.

EXAMPLE 3

Preparation and characterization of the mesoporous ozonation catalyst.

(1) Preparation of template bead comprising calcium alginate gel:

At a temperature of between 15 and 30° C., an aqueous solution of sodium alginate having a mass percentage of 1.0% was added dropwise to a 0.27 mol/L $CaCl_2$ aqueous solution using a syringe with needle having an inner diameter of 0.69 mm, and the injection flow rate was controlled at 4.5 mL/h using a syringe pump. Thereafter a gel bead was formed, stirred for 18 hours and washed with water to obtain the template bead comprising calcium alginate gel.

(2) Preparation of titanium-zirconium composite oxide bead:

The template bead prepared in 1) was washed with absolute ethanol, and then placed in a mixed alkoxide solution of titanium and zirconium for 18 hours, then transferred to an aqueous solution of isopropanol for 18 hours; after removing the solution, the template bead was dried at a temperature of between 15 and 30° C. for 72 hours, and then dried at 55° C. for 8 hours; then calcined at 600° C. for 3 hours, cooled to normal temperature, washed with 0.1 mol/L nitric acid, washed with water and dried at 60° C. for 24 hours to obtain titanium-zirconium composite oxide bead. The mixed alkoxide solution of titanium and zirconium was a mixed solution prepared by dissolving titanium isopropoxide (IV) and zirconium n-propoxide (70% n-propanol solution) in a volume ratio of 2:1. The mass of the mixed alkoxide solution of titanium and zirconium was 8 times that of the template bead comprising calcium alginate gel; The aqueous solution of isopropanol was a mixed solution of pure water and isopropyl alcohol in a volume ratio of 2:1.

(3) Impregnation: immersing the titanium-zirconium composite oxide bead prepared in (2) in a 0.10 mol/L $Ce(NO_3)_3$ solution for 8 hours, and filtering off the solution to yield a solid, then drying the filtered solid at 105° C. for 16 hours.

(4) Calcination: the solid obtained in (3) was calcined at a temperature of 500° C. for 2 hours to obtain a spherical ozone oxidation catalyst having a mesoporous cerium-titanium-zirconium composite oxide as a main component.

The ozone oxidation catalyst was present as spherical particles with diameter distribution of 0.9-1.2 mm. Using the same test method in Example 1, a specific surface area of 163.1 $m^2/g$, a pore volume of 0.338 $cm^3/g$, an average pore diameter of 6.84 nm, and a compressive strength of 10.2 N were shown. The mass fractions of cerium, titanium, zirconium, and oxygen were 10.2%, 31.1%, 14.7%, and 44.6%, respectively. The valence state of cerium element consists of trivalent and tetravalent, and the proportion of trivalent was 53%. The parallel lattice fringes with a stripe spacing of 0.339 nm were observed under a transmission electron microscope.

EXAMPLE 4

The mesoporous ozone oxidation catalyst in this example had the same composition as that of Example 1. 2.5 g of the ozonation catalyst prepared in Example 1 or the titanium-zirconium composite oxide bead obtained in (2) was placed in a bubble column reactor having an inner diameter of 10 cm. The bottom of the reactor was equipped with a microporous sand core gas distribution device, and the outer layer was provided with an interlayer capable of constant temperature circulating water bath. A constant temperature circulating water of 25° C. was introduced into the interlayer, and an oxalic acid solution having an initial concentration of 100 mg/L was prepared using anhydrous oxalic acid and ultrapure water. The resulting solution had a pH of 3.0, a solution volume of 500 mL, and a temperature of 25° C., which was added to the above bubble column reactor. The ozone/oxygen mixed gas, in which the gas phase concentration of ozone was 15 mg/L, was dispersed into fine bubbles by the microporous sand core gas distribution tray at the bottom of the reactor and then introduced into the solution at a flow rate of 0.2 L/min. The samples were taken at a series of time points, and determined how the concentration of oxalic acid in the water changes with time using high performance liquid chromatography. The above ozone/oxygen gas was replaced with oxygen to conduct an experiment to show the adsorption effect of the material on the oxalic acid.

Figure 3:
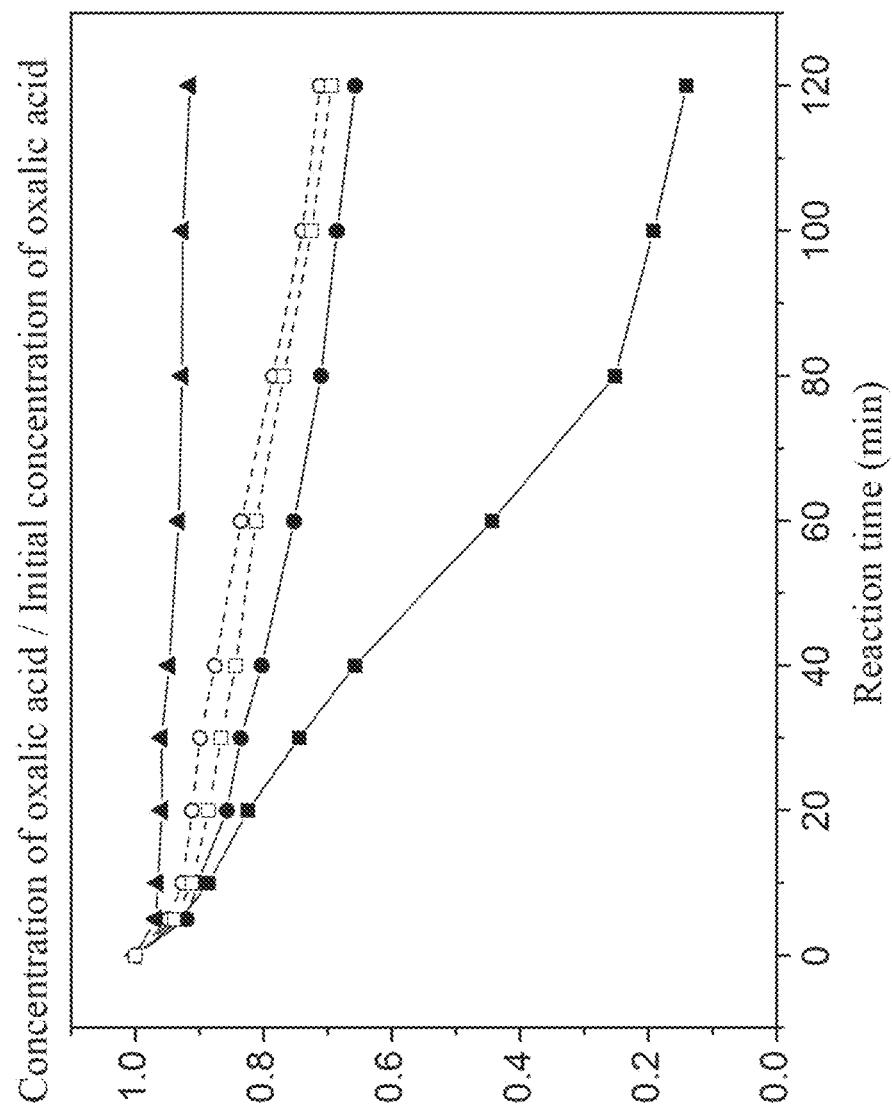
FIG. 3 is a graph showing the relationship between the concentration of oxalic acid and the reaction time of the catalyst in Example 4 of the disclosure.

As shown in FIG. 3,

▲ indicates the effect of ozonation alone in Example 4,

○ indicates the adsorption of the titanium-zirconium composite oxide bead in Example 4, □ indicates the adsorption of the mesoporous ozone oxidation catalyst in Example 4, ● indicates the effect of ozonation catalyzed by titanium-zirconium composite oxide bead in Example 4, ■ indicates the effect of ozonation catalyzed by the mesoporous ozonation catalyst in Example 4.

The results in FIG. 3 show that the degradation rate of oxalic acid reached more than 85% after adding mesoporous ozonation catalyst at 120 minutes, but the degradation rate of simple oxidation treatment was only 8%, and the degradation of titanium-zirconium composite oxide bead was also only 30%. Therefore, the mesoporous ozonation catalyst of the present example has a significantly higher degradation efficiency of oxalic acid than ozone oxidation alone or by using titanium-zirconium composite oxide bead. At this time, the adsorption effect of the mesoporous ozone oxidation catalyst and the titanium zirconium composite oxide sphere on oxalic acid was 30%, indicating that the removal of oxalic acid by the mesoporous ozonation catalyst of the present example mainly relies on catalytic oxidation rather than adsorption. The total organic carbon in the solution was measured as a function of time, and the results showed that the concentration of total organic carbon was proportional to the concentration of oxalic acid, indicating that oxalic acid was mineralized. Under acidic conditions, oxalic acid was a substance that could hardly be degraded by ozone oxidation alone, and was one of the common terminal products of ozone oxidation. Therefore, the results of the examples showed that the ozone oxidation catalyst of the disclosure had high catalytic activity and high degree of mineralization, and could significantly increase the degree of mineralization of ozone oxidation.

EXAMPLE 5

Comparison of catalytic performance of mesoporous ozonation catalysts as well as mixtures composed of titanium-zirconium composite oxide bead/cerium oxide. 2.5 g of the mesoporous ozone oxidation catalyst prepared in Example 1 was added to the porous gas washing bottle; or the same quality of the cerium oxide prepared in Example 1; or the mixture of titanium-zirconium composite oxide bead/cerium oxide powder obtained in Example 1, which was ratio according to the mass fraction in the mesoporous ozonation catalyst. 500 mL of the oxalic acid solution prepared in Example 4 was placed in a gas washing bottle. And then the ozone/oxygen mixed gas, in which the gas phase concentration of ozone was 15 mg/L, was dispersed into fine bubbles by the microporous sand core gas distribution tray at the bottom of the reactor and then introduced into the solution at a flow rate of 0.2 L/min. The samples were taken at a series of time points, and determined how the concentration of oxalic acid in the water changes with time using high performance liquid chromatography. The above ozone/oxygen gas was replaced with oxygen to conduct an experiment to show the adsorption effect of the material on oxalic acid.

Figure 4:
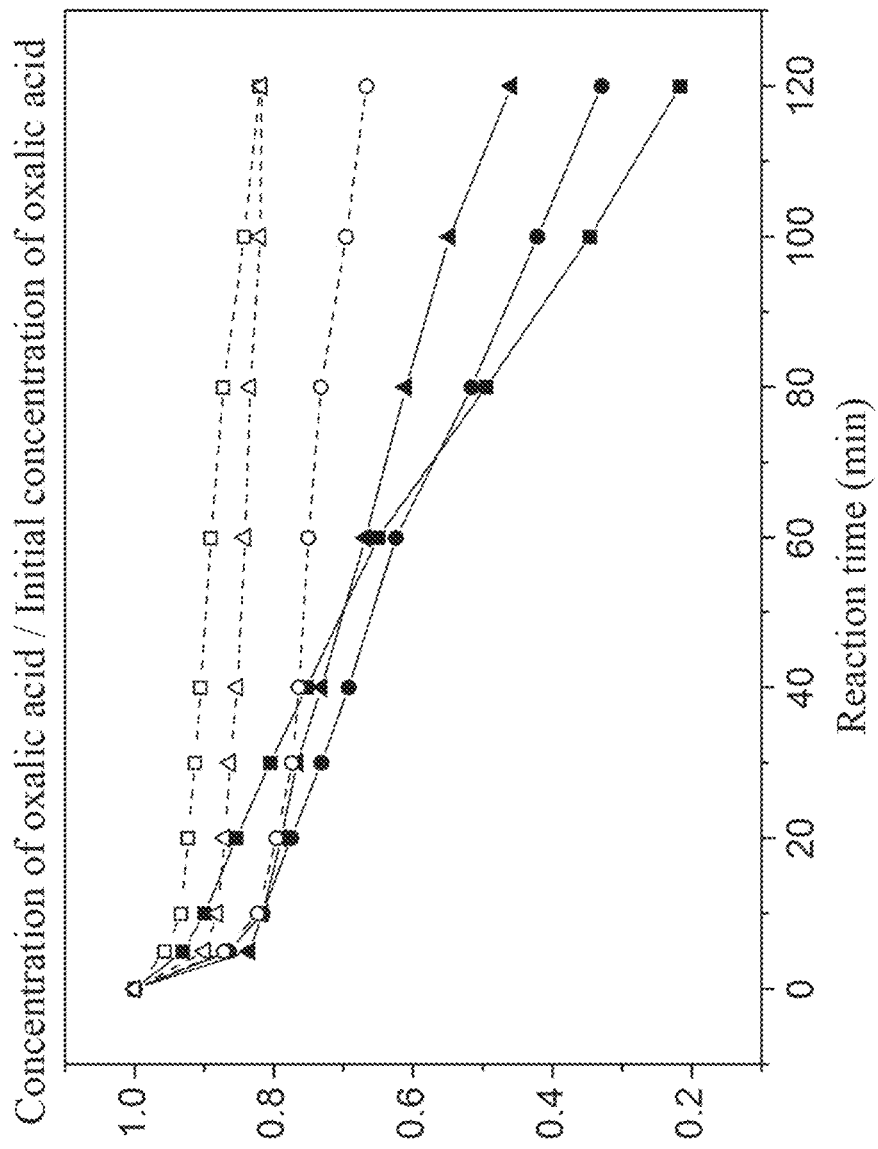
FIG. 4 is a graph showing the relationship between the concentration of oxalic acid and the reaction time of the catalyst in Example 5 of the disclosure.

As shown in FIG. 4,

Δ indicates the adsorption of cerium oxide powder,

○ indicates the adsorption of the mixture,

☐ indicates the adsorption of the mesoporous ozone oxidation catalyst of the present example, ▲ A indicates the effect of cerium oxide powder catalyzing ozonation, ● indicates the effect of the mixture catalyzing ozonation, ■ indicates the effect of the mesoporous ozonation catalyst of the present example to catalyze ozonation.

The results in FIG. 4 showed that at 10 minutes of the experiment, the adsorption of oxalic acid by the cerium oxide powder was saturated and the adsorption of oxalic acid was completed. This result was attributed to the small particle size of cerium oxide, which makes the adsorption of oxalic acid much faster. When the catalyst of the disclosure was used to catalyze ozonation, at 120 min, the degradation efficiency of oxalic acid was significantly higher than that of cerium oxide powder as well as the mixture of titanium zirconium composite oxide/cerium oxide. In addition, the adsorption of oxalic acid by the above three substances at this time reached a saturated state, indicating that the removal of oxalic acid by the mesoporous ozone oxidation catalyst of the disclosure mainly relies on catalytic oxidation rather than adsorption. This example showed that the catalytic effect of the catalyst was not a simple superposition of the effect of the titanium-zirconium composite oxide sphere and the cerium oxide, especially the high degree of mineralization could significantly increase the degree of mineralization of ozonation.

EXAMPLE 6

The mesoporous ozonation catalyst of this example had the same composition as that of Example 1, 500 mg/L of sulfate was added to the composition of the oxalic acid solution in Example 1, and the other conditions were the same as in Example 4.

Figure 5:
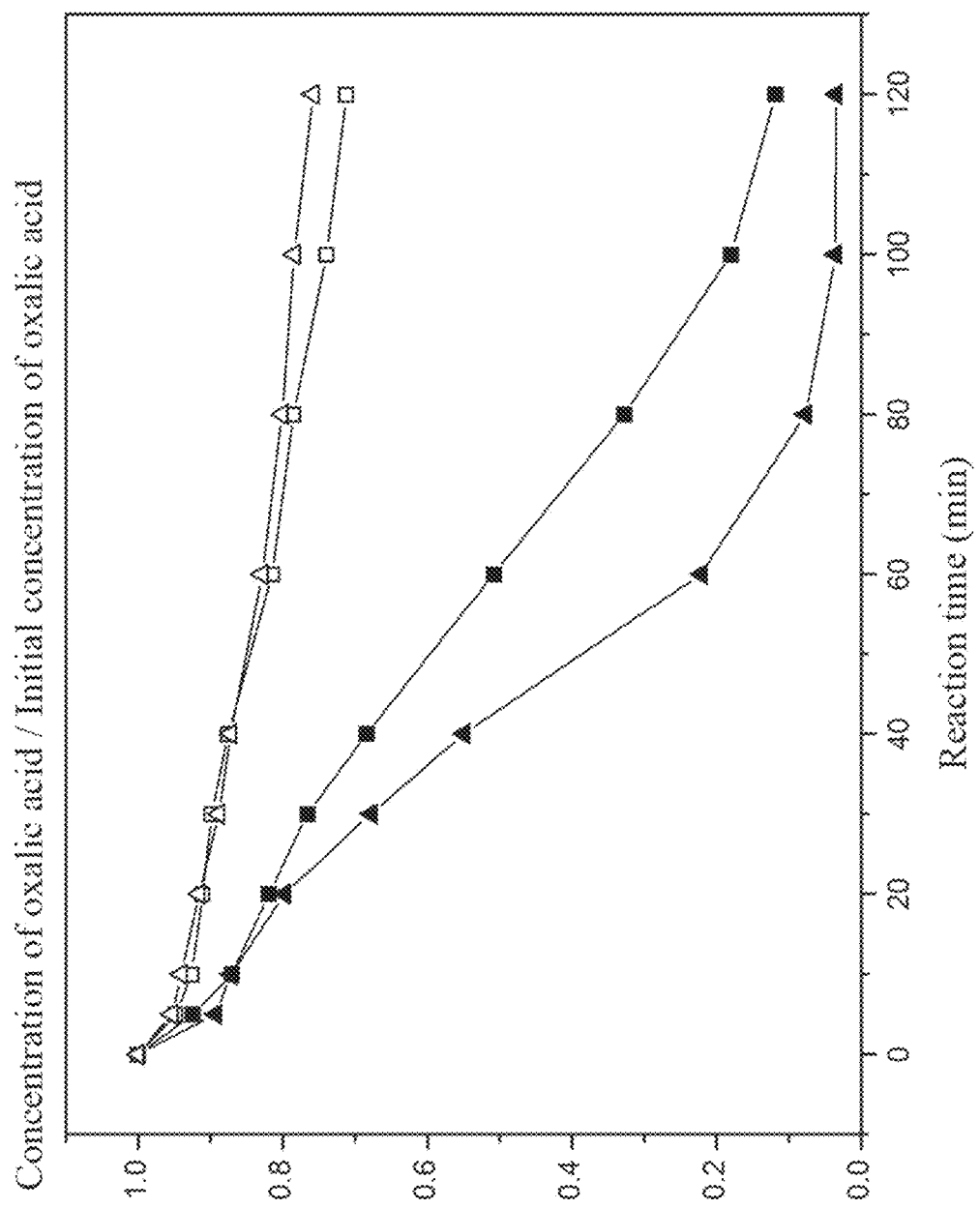
FIG. 5 is a graph showing the relationship between the concentration of oxalic acid and the reaction time of the catalyst in Example 6 of the disclosure.

As shown in FIG. 5,

☐ indicates the adsorption of the mesoporous ozonation catalyst in the absence of sulfate, Δ indicates the adsorption of mesoporous ozonation catalyst under the condition of coexistence of sulfate, ■ indicates that the mesoporous ozonation catalyst catalyzes the oxidation of ozone in the absence of sulfate.

▲ indicates that the mesoporous ozonation catalyst catalyzes the oxidation of ozone under the condition of coexistence of sulfate.

At 120 minutes, the degradation rate of oxalic acid was 90% in the absence of sulfate, and the degradation rate of oxalic acid was 95% under the condition of coexistence of sulfate. The experimental results showed that the mesoporous ozonation catalyst of the disclosure, under the condition of coexistence with sulfate, not only did not inhibit the effect of ozonation, but was more efficient. The characterization by electron paramagnetic resonance (EPR) indicated that sulfate radicals were generated via this process to further increase the catalytic activity of the catalyst.

This example demonstrated that the mesoporous ozonation catalyst of the disclosure had a wide range of application and could more efficiently catalyze ozonation of contaminants under the condition of coexistence of sulfate.

EXAMPLE 7

Figure 6:
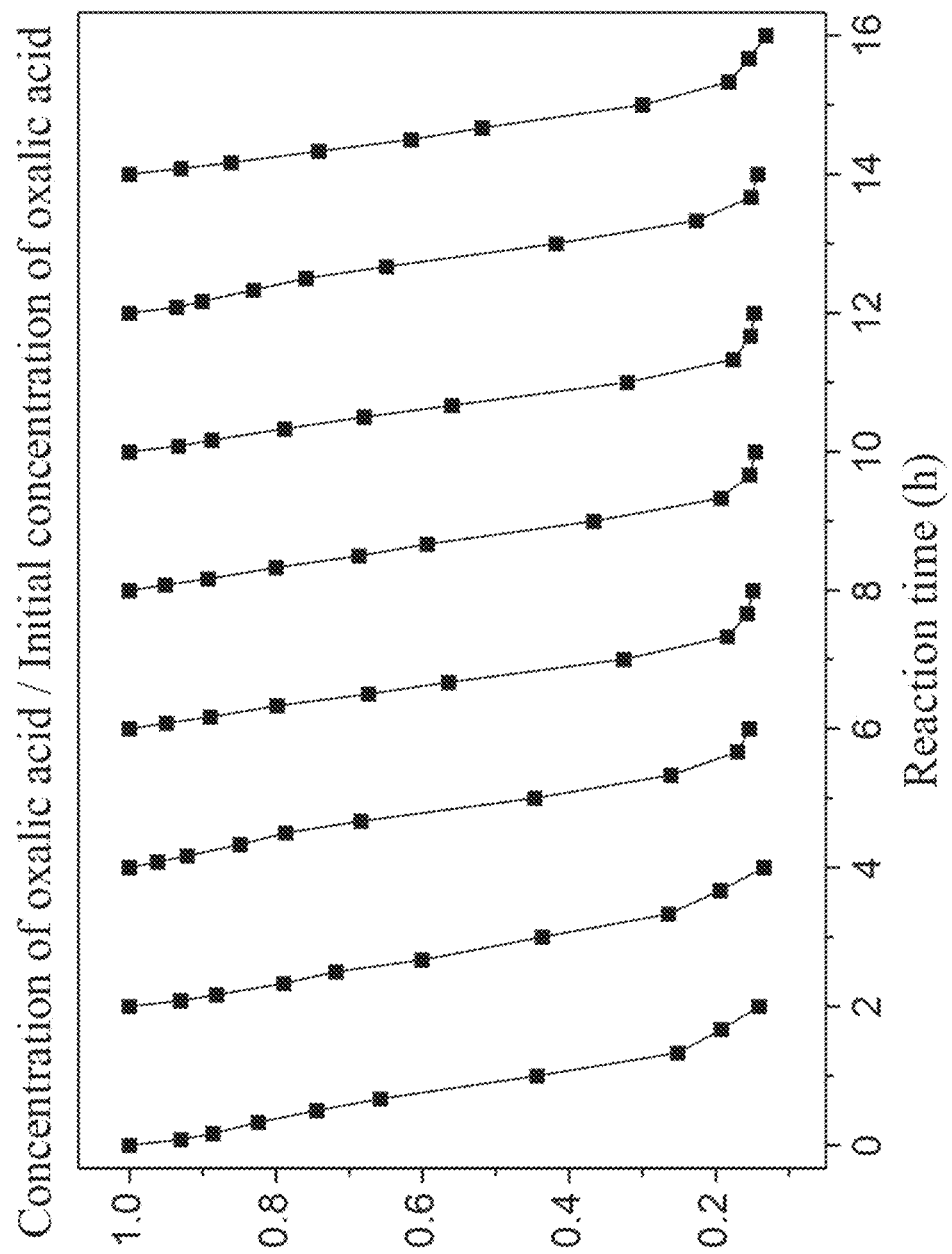
FIG. 6 is a graph showing the relationship between the concentration of oxalic acid and the reaction time of the catalyst in the process of catalyzing the oxidation of oxalic acid for eight times in Example 7 of the disclosure.

Regeneration and repeated use of the mesoporous ozonation catalysts to catalyze the oxidation of oxalic acid by ozone and the stability of this process. The catalyst in Example 4 was recovered and subjected to a thermal regeneration treatment at 200° C., and the experiment of Example 4 was repeated to carry out a recycling experiment. The above process was repeated for a total of 8 cycles. As shown in FIG. 6, the mesoporous ozonation catalyst maintained a high catalytic activity during the repeated recycling. The concentration of cerium in the effluent of each cycle during the repeated recycling was determined. The concentrations in the first three cycles were 0.044, 0.012, and 0.008 mg/L, respectively, and no cerium was detected in the effluent of the subsequent cycles. The catalyst used for the reuse experiments was recovered and characterized by XPS. The valence state of the cerium element was still composed of trivalent and tetravalent, with the trivalent being 50%, almost identical to the newly prepared catalyst. This example demonstrated that the mesoporous ozonation catalyst of the disclosure had long-lasting and high catalytic activity and high stability. The catalyst did not lose the active component or release toxic hazardous materials even when it was repeatedly used under acidic conditions of pH=3, and the composition of the valence state of the active ingredient did not change after repeated use.

EXAMPLE 8

The mesoporous ozone oxidation catalyst in this example had the same composition as that of Example 1. Different concentrations of tert-butanol were added as a hydroxyl radical scavenger to the oxalic acid solution of Example 1, and the other conditions were the same as in Example 1.

Figure 7:
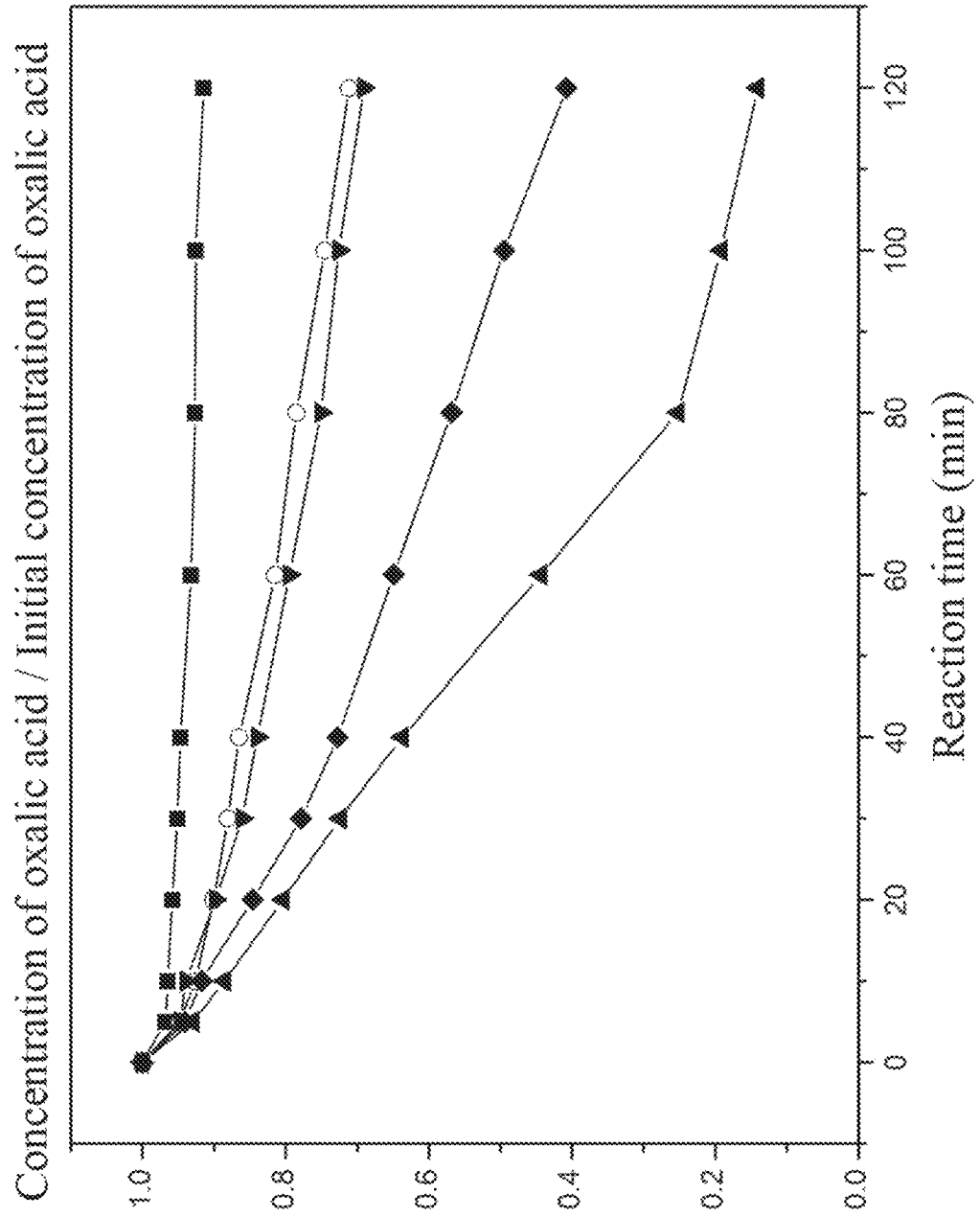
FIG. 7 is a graph showing the relationship between the concentration of oxalic acid and the reaction time of the catalyst in Example 8 of the disclosure.

As shown in FIG. 7,

■ indicates the effect of ozonation alone,

○ indicates the adsorption of the mesoporous ozone oxidation catalyst,

▼ indicates the adsorption of mesoporous ozonation catalyst under the condition of adding 40 mg/L tert-butanol, ♦ indicates the adsorption of mesoporous ozonation catalyst under the condition of adding 5 mg/L tert-butanol.

▲ indicates the adsorption of mesoporous ozonation catalyst under the condition of no addition of tert-butanol.

At 120 minutes of the experiment, the degradation rate of oxalic acid by mesoporous ozonation catalyst was 30%, 60% and 90% under the corresponding conditions of 40 mg/L, 5 mg/L and no addition of tert-butanol, respectively. Experiments showed that the efficiency of catalytic oxidation of oxalic acid was gradually reduced with the increase of tert-butanol concentration, indicating that the principle of mesoporous ozonation catalyst catalyzing ozonation of oxalic acid was to convert ozone into the hydroxyl radical having stronger oxidizing ability, and then efficiently mineralize oxalic acid.

Figure 8:
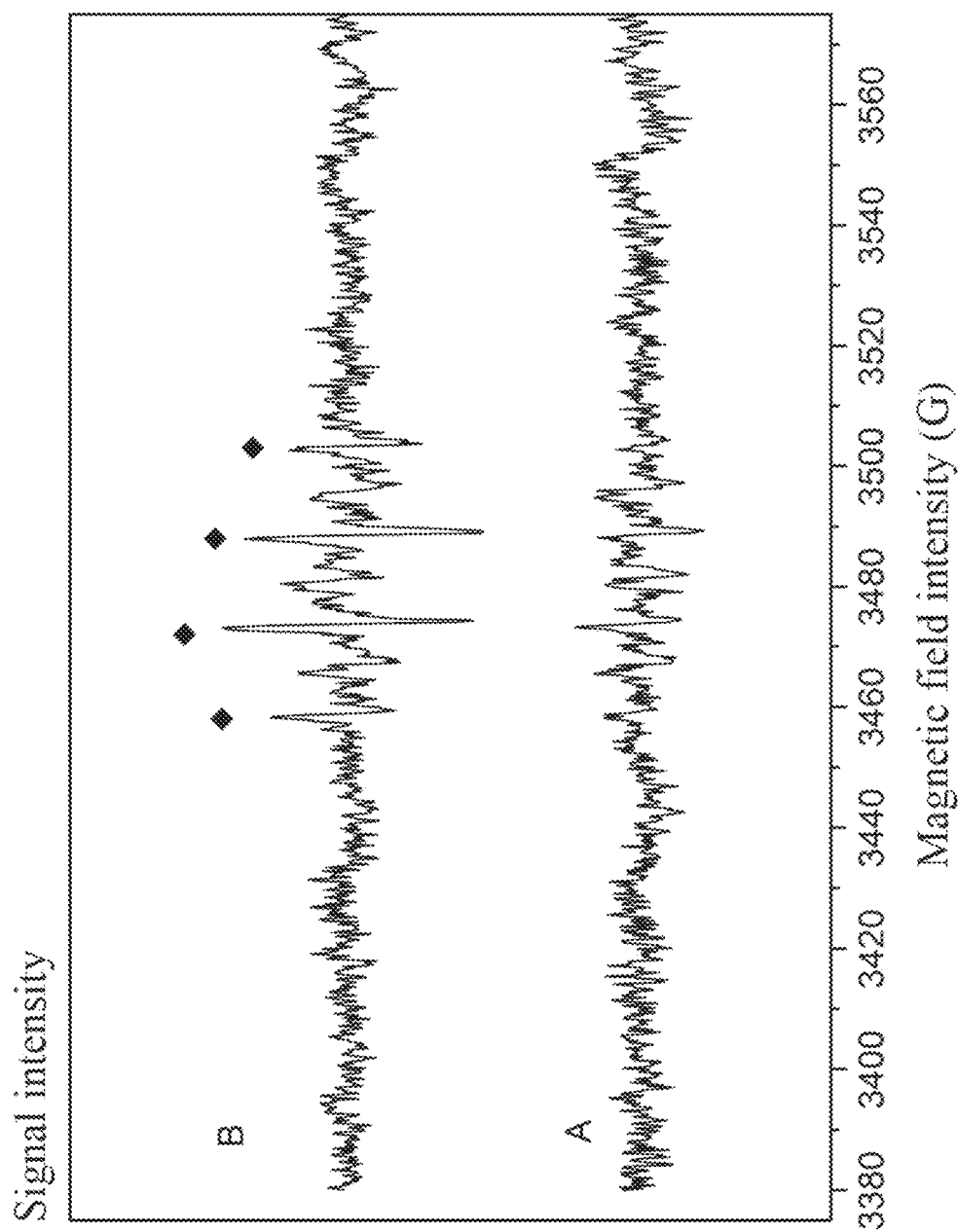
FIG. 8 is an electron paramagnetic resonance (EPR) spectrum in Example 8 of the disclosure.

5,5-dimethyl-1-pyrroline N-oxide (DMPO) was used as a spin trapping agent. The EPR spectrum of ozonation alone and the ozonation catalyzed by mesoporous ozonation catalyst of Example are shown in FIG. 8. The results showed that ozonation alone did not produce a distinct signal peak, whereas the use of the mesoporous ozonation catalyst of the disclosure to catalyze ozonation produced a distinct signal peak derived from hydroxyl radicals. This example demonstrated that the mechanism by which the mesoporous ozonation catalysts of the disclosure catalyze ozonation is to convert ozone into hydroxyl radicals that are more efficient at oxidizing pollutants.

It will be obvious to those skilled in the art that changes and modifications may be made, and therefore, the aim in the appended claims is to cover all such changes and modifications.

What is claimed is:

1. A catalyst, comprising a cerium-titanium-zirconium composite oxide, wherein:
   the catalyst is in the form of a solid spherical particle having a diameter of between 0.7 and 1.2 mm;
   the catalyst exhibits lattice fringes under transmission electron microscope, the lattice fringes having a spacing between 0.332 and 0.339 nm; and
   the solid spherical particle comprises 10-15 wt. % of cerium, 30-50 wt. % of titanium, 5-15 wt. % of zirconium, 30-50 wt. % of oxygen, and less than 2 wt. % of calcium.

2. The catalyst of claim 1, wherein the solid spherical particle is porous and has an average pore diameter of between 4.0 and 7.0 nm, a specific surface area of the solid spherical particle is between 160 and 200 $m^2/g$, and a pore volume of the solid spherical particle is between 0.31 and 0.34 $cm^3/g$.

3. The catalyst of claim 2, wherein the cerium comprises 45-55% of trivalent cerium, and the balance is tetravalent cerium.

4. A method of preparing the catalyst of claim 1, comprising:
   1) stirring a $CaCl_2$) aqueous solution and dropwise adding a sodium alginate aqueous solution to the $CaCl_2$) aqueous solution at a temperature of between 15 and 30° C. to yield a gel bead; continuously stirring for 12-24 hours to allow the sodium alginate aqueous solution in the gel bead to transform into a calcium alginate gel, and washing the gel bead to yield a template bead comprising calcium alginate gel;
   2) washing the template bead in 1) with anhydrous ethanol, infiltrating the template bead with a mixed solution of titanium alkoxide and zirconium alkoxide for 12 to 24 hours, transferring and immersing the template bead in an aqueous solution of isopropyl alcohol for 12-24 hours, taking out the template bead, drying the template bead at a temperature of between 15 and 30° C. for 24-72 hours and at 55-65° C. for 4-8 h, calcining the template bead for 3-8 hours at 350-600° C., cooling to normal temperature, washing with a nitric acid solution, washing with water, and drying to obtain a titanium-zirconium composite oxide bead;
   3) immersing the titanium-zirconium composite oxide bead obtained in 2) in $Ce(NO_3)_3$ solution for 2-8 hours, filtering and collecting a solid, drying the solid at 105° C. for 12-24 hours to obtain a solid; and
   4) calcining the solid obtained in 3) at a temperature of 400 to 500° C. for 2 to 6 hours;
   wherein:
   in 2), the mixed solution of titanium alkoxide and zirconium alkoxide is prepared by mixing titanium isopropoxide and a n-propanol solution comprising 70 wt. % of zirconium n-propoxide, and a volume ratio of the titanium isopropoxide to the n-propanol solution is between 2:1 and 6:1;
   in 2), a mass of the mixed solution of titanium alkoxide and zirconium alkoxide is 2 to 8 times that of the template bead; and the aqueous solution of isopropyl alcohol is prepared by mixing pure water and isopropyl alcohol in a volume ratio of 0.5-2:1; and
   in 3), the $Ce(NO_3)_3$ solution has a concentration of 0.10-0.25 mol/L.

5. A method of wastewater treatment using the catalyst of claim 1, comprising: placing the catalyst of claim 1 in a fixed bed or fluidized bed reactor; introducing wastewater to the fixed bed or fluidized bed reactor continuously or in batches; and continuously or in batches aerating the wastewater in the reactor with an ozone-containing gas.

6. The method of claim 5, further comprising regenerating the catalyst, which comprises taking the catalyst out of the reactor, washing with water and drying, calcining at 200-500° C. for 2-6 hours, and cooling.

* * * * *